United States Patent
Bates et al.

(10) Patent No.: US 8,046,700 B2
(45) Date of Patent: Oct. 25, 2011

(54) SYSTEM FOR MANAGING ENCOUNTERS IN A VIRTUAL WORLD ENVIRONMENT

(75) Inventors: Cary Lee Bates, Rochester, MN (US); Jim Chun-Ta Chen, Rochester, MN (US); Zachary Adam Garbow, Rochester, MN (US); Gregory Edward Young, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/962,841

(22) Filed: Dec. 21, 2007

(65) Prior Publication Data

US 2009/0164918 A1    Jun. 25, 2009

(51) Int. Cl.
*G06F 3/00* (2006.01)
*G06F 3/048* (2006.01)

(52) U.S. Cl. .................... 715/757; 715/758; 715/745

(58) Field of Classification Search .................. 715/757, 715/758, 706, 745
See application file for complete search history.

(56) References Cited

U.S. PATENT DOCUMENTS

| | | | |
|---|---|---|---|
| 2003/0156134 A1* | 8/2003 | Kim | 345/753 |
| 2008/0215994 A1 | 9/2008 | Harrison et al. | |
| 2008/0307066 A1 | 12/2008 | Amidon et al. | |
| 2009/0037822 A1 | 2/2009 | Kandekar et al. | |
| 2009/0055484 A1* | 2/2009 | Vuong et al. | 345/619 |
| 2009/0158151 A1 | 6/2009 | Cheng et al. | |
| 2009/0164458 A1 | 6/2009 | Jung et al. | |

OTHER PUBLICATIONS

U.S. Patent Application entitled, "Generating Data for Managing Encounters in a Virtual World Environment," filed Dec. 24, 2007, U.S. Appl. No. 11/963,883.

* cited by examiner

*Primary Examiner* — Weilun Lo
*Assistant Examiner* — Truc Chuong
(74) *Attorney, Agent, or Firm* — Patterson & Sheridan, LLP (57) ABSTRACT

Embodiments of the invention provide techniques for providing information for avoiding specific users of an immersive virtual environment. Generally, a primary user may specify other users to be avoided in a blacklist. The blacklisted users may be specified to be avoided at all times, or may be specified to be avoided in certain situations. In one embodiment, a user may be added to the blacklist during a specific situation, resulting in the characteristics of the situation being automatically stored in the blacklist. Subsequently, the blacklist may be used to determine the locations of the blacklisted users matching the current situation. The primary user may then avoid the locations having the greatest probability of encountering blacklisted users.

24 Claims, 4 Drawing Sheets

SYSTEM FOR MANAGING ENCOUNTERS IN A VIRTUAL WORLD ENVIRONMENT

BACKGROUND OF THE INVENTION

1. Field of the Invention

Embodiments of the invention relate to the use of immersive virtual environments. More specifically, embodiments of the invention relate to avoiding specific users of an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method. The method generally includes: receiving navigational input for moving an avatar of a user through a virtual world; responsive to the navigational input, moving the avatar through the virtual world; during movement of the avatar through the virtual world, determining information relating to possible encounters with one or more other avatars the user desires to avoid encountering; the information being determined according to predefined user-avoidance criteria specific to the user; and providing the information to the user.

Another embodiment of the invention includes a computer-readable storage medium including a program, which when executed on a processor performs an operation. The operation may generally include: receiving navigational input for moving an avatar of a user through a virtual world; responsive to the navigational input, moving the avatar through the virtual world; during movement of the avatar through the virtual world, determining information relating to possible encounters with one or more other avatars the user desires to avoid encountering; the information being determined according to predefined user-avoidance criteria specific to the user; and providing the information to the user.

Still another embodiment of the invention includes a system having a processor and a memory. The memory may store a program, which when executed by the processor, is configured to perform the steps of: receiving navigational input for moving an avatar of a user through a virtual world; responsive to the navigational input, moving the avatar through the virtual world; during movement of the avatar through the virtual world, determining information relating to possible encounters with one or more other avatars the user desires to avoid encountering; the information being determined according to predefined user-avoidance criteria specific to the user; and providing the information to the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing financial transactions, and the like. Thus, multiple users, although in different physical locations, may be present in the same virtual location, and may interact therein by using their respective avatars.

However, in some situations, a first user may wish to avoid other users within the virtual world. For example, in a situation where the first user is participating in a professional activity (e.g., a virtual business meeting), he may wish to avoid casual friends who may behave unprofessionally, and thus cause embarrassment. In another example, the first user may have gone through a divorce, and may wish to go on a date in the virtual world without running into the former spouse.

Embodiments of the invention provide techniques for providing information for avoiding specific users of an immersive virtual environment. In one embodiment, a primary user may specify other users to be avoided in a blacklist. The blacklisted users may be specified to be avoided at all times, or may be specified to be avoided in certain situations. In one embodiment, a user may be added to the blacklist during a specific situation, resulting in the characteristics of the situation being automatically stored in the blacklist. Subsequently, the blacklist may be used to determine the locations of the blacklisted users matching the current situation. The primary user may then avoid the locations having the greatest probability of encountering blacklisted users.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
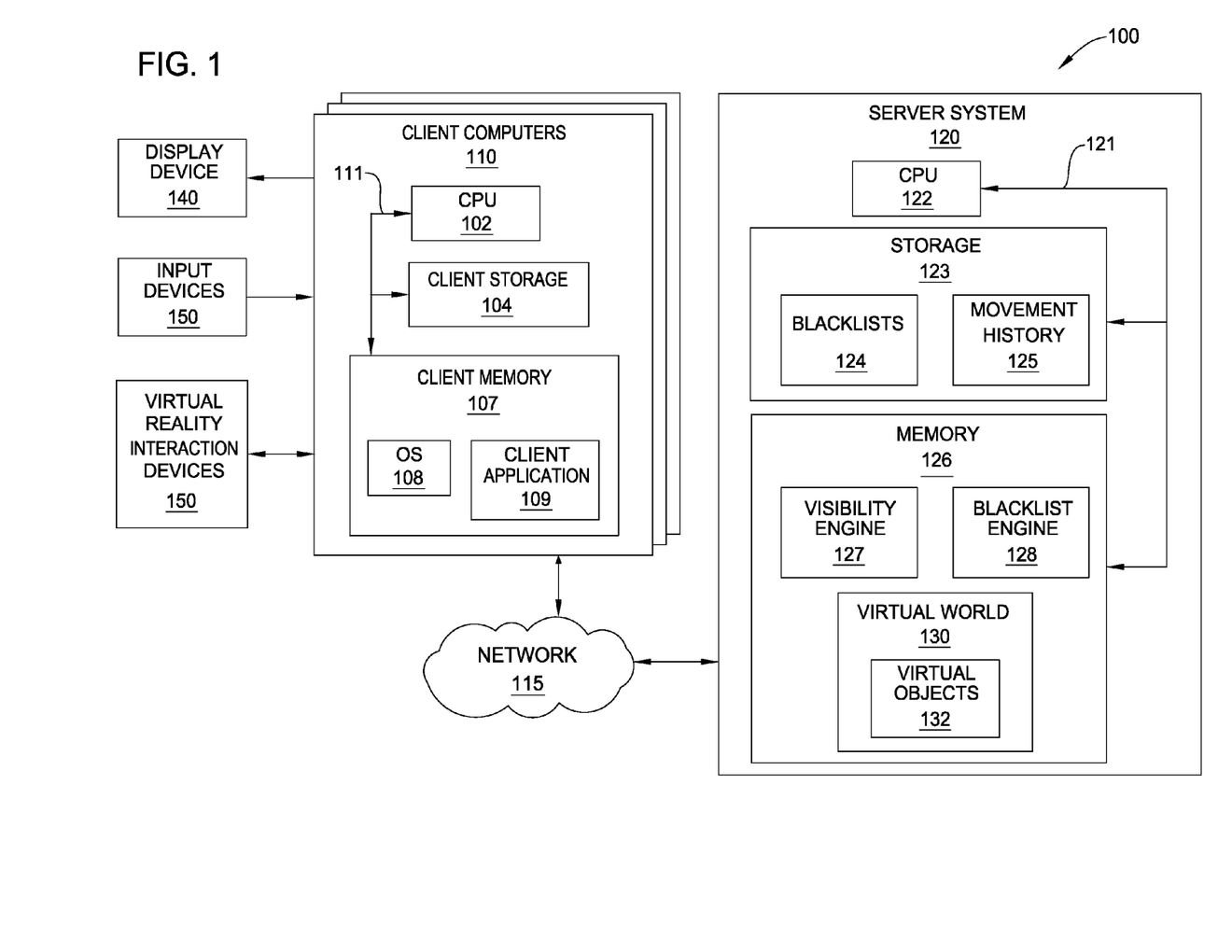
FIG. 1 is a block diagram that illustrates a client server view of computing environment, according to one embodiment of the invention.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115. Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130 on the server 120, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

Figure 2:
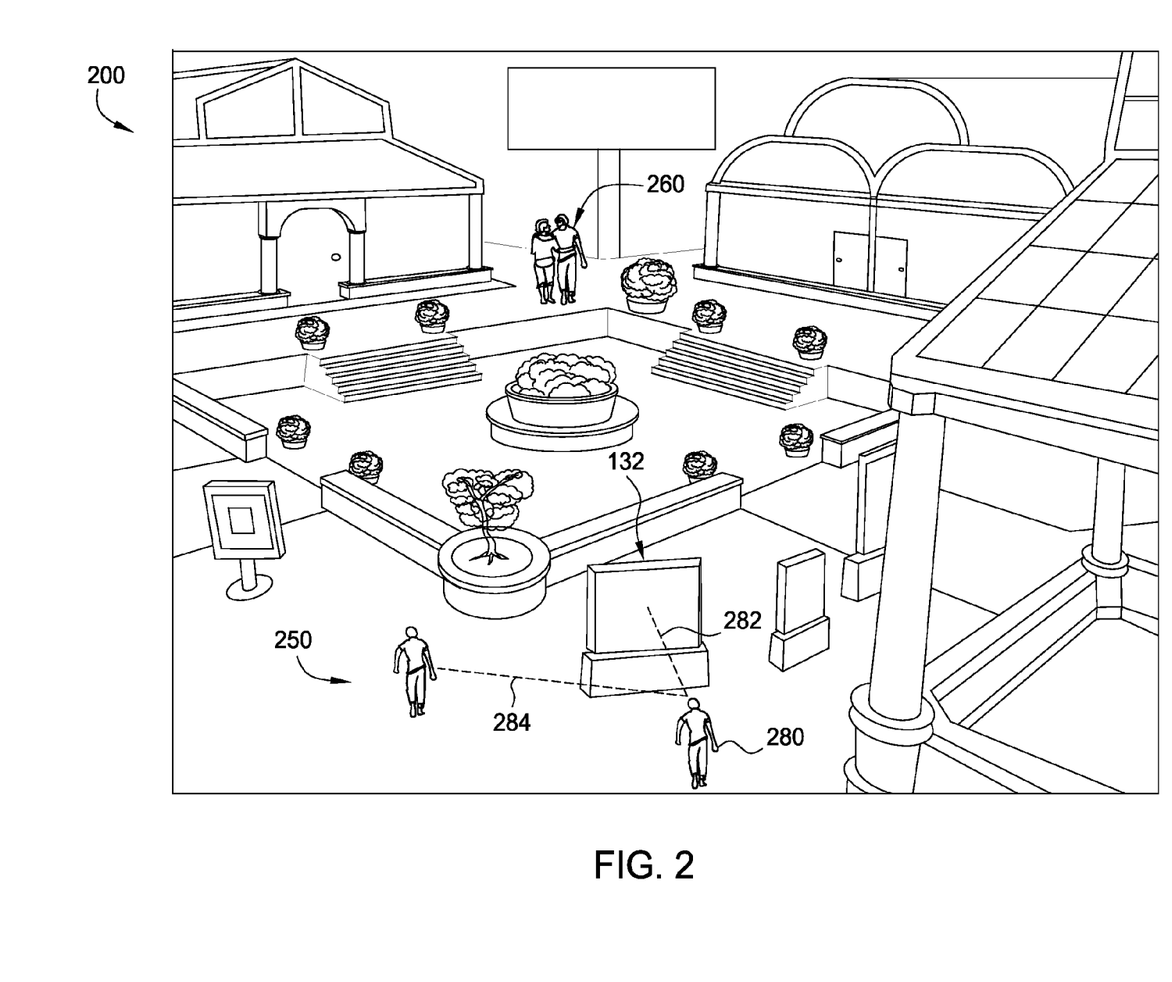
FIG. 2 illustrates a user display for a user participating in a virtual world, according to one embodiment of the invention.

By way of example, FIG. 2 illustrates a user display 200 showing a third-person view presented to a user participating in a virtual world, according to one embodiment of the invention. In this example, the primary user (i.e., the user viewing the user display 200) is represented by avatar 270, and is present in a virtual town square. The primary user may interact with elements of the virtual world, including objects, locations, and other users. For example, as illustrated in FIG. 2, the avatar 270 is interacting with an avatar 260 of a second user, thus enabling the primary user to communicate with the second user.

In some situations, the primary user may wish to avoid contact with a third user, illustrated by avatar 280. For example, the primary user may be using avatar 270 to conduct a business negotiation with avatar 260, and may wish to avoid a casual friend represented by avatar 280. However, as in the situation illustrated in FIG. 2, being present in the same virtual location may result in avatar 270 having an unwanted encounter with avatar 280. More specifically, in the event that avatar 270 comes into a line of sight of the user of avatar 280, an unwanted encounter may occur.

In one embodiment, the line of sight of a user will depend on the type of view of the virtual world being used by that user. That is, if the user of avatar 280 is viewing a first-person perspective of the virtual world (i.e., seeing through the avatar's eyes), he may be able to see a fourth avatar 250, since he has an unobstructed line of sight 284 (shown as a dotted line) to the fourth avatar 250. In contrast, the user of avatar 280 may not be able to see the avatar 270, since a second line of sight 282 to avatar 270 may be obstructed by the virtual objects 132. Further, in the situation that the user of avatar 280 is viewing a third-person view of the virtual world (i.e., similar to user display 200 shown in FIG. 2), his perspective may be that of a "camera eye" floating over the scene, and would thus allow him to see the avatar 270 over and/or around the virtual objects 132. In one embodiment, the line of sight of a user may also depend on the distance between the user's avatar and another avatar. That is, the virtual world 130 may include predefined limits on distances at which two avatars may view each other.

Returning to FIG. 1, the user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

As shown, the server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet.

In one embodiment, storage 123 may include a set of blacklists 124 and a movement history 125. The movement history 125 may store data describing past locations and movements of avatars within the virtual world 130. Each blacklist 124 may be a data structure corresponding to a given user (hereafter referred to as the primary user), and may be configured to store characteristics of other users (hereafter referred to as blacklisted users) that the primary user may wish to avoid. That is, the blacklist 124 may describe the primary user's preferences with regards to avoiding contact with the blacklisted users while present in the virtual world. A method for adding a user to the blacklist 124 is described below with reference to FIG. 3. Generally, the blacklist 124 may represent any data structure suited to the current application, such as a database table, XML document, flat file, and the like.

In one embodiment, the characteristics stored in the blacklist 124 may include an identifier and an avoidance level assigned to each blacklisted user. The avoidance level may indicate a degree to which the primary user wishes to avoid the blacklisted user having the avoidance level. For example, in a situation where the primary user must come into contact with either of two blacklisted users, the primary user will usually choose to come into contact with the user having a lower avoidance level.

In one embodiment, the blacklist 124 may describe a user as being on an absolute (unconditional) blacklist, meaning that the primary user wishes to avoid any contact with the blacklisted user in all circumstances. Alternatively, the blacklist 124 may describe a user as being on a situational (conditional) blacklist, meaning the primary user wishes to avoid contact with the blacklisted user only in defined situations. A situational blacklist may be defined in terms of characteristics of the primary user's situation, such as a location (e.g., avoid at my office, avoid in public spaces, etc.), companions (e.g., avoid when I am with my boss, avoid when I am with clients, etc.), or time frame (e.g., avoid from 8 AM to 4 PM each day). Further, a situational blacklist may also be defined in terms of the primary user's current profile, meaning a general description of the primary user's intended activity or mode of interacting while in the virtual world. For example, a situational blacklist may specify that a blacklisted user is to be avoided while the primary user is in a "Work" profile (i.e., the primary user is conducting business affairs). Furthermore, a situational blacklist may be defined in terms of the primary user's current activity (e.g., avoid while I am working, avoid while I am talking, etc.).

In one embodiment, the characteristics stored in the blacklist 124 may be defined in terms of groups of users of the virtual world. That is, the blacklist 124 may include defined groups of users to avoid, either conditionally or unconditionally. For example, the blacklist 124 may specify that the group "Competitors" should always be avoided at all times, and that the group "Friends" should be avoided when the primary user is using a "Work" profile, or is at an office location. Further, the blacklist 124 may specify a group to avoid when the primary user is in the company of another person or group (e.g., avoid the group "Friends" when I am in the company of the group "Business Clients"). Furthermore, the blacklist 124 may specify a user to avoid when that user is in the company of another person or group (e.g., avoid user "John" when he is in the company of user "Jane").

As shown, memory 126 includes a virtual world 130, a visibility engine 127 and a blacklist engine 128. In one embodiment, the virtual world 130 may be a software application that allows a user to explore and interact with an immersive environment. As described, the user may access the virtual world 130 by using the client application 109, according to one embodiment. The virtual world 130 may include virtual objects 132, such as buildings, trees, houses, etc.

The blacklist engine 128 may be a software application configured to enable a primary user to create and modify a blacklist 124. Additionally, the blacklist engine 128 may be configured to determine situations in which the primary user may encounter a blacklisted user, and to assist the primary user in avoiding such encounters.

In one embodiment, the primary user may use the blacklist engine 128 to manually add users to the blacklist 124. For example, the primary user may interact with a user interface provided by the blacklist engine 128 in order to specify an identifier for the user being blacklisted (e.g., user name, user alias, etc.), the type of blacklist (i.e., absolute or situational), a user group (e.g., "Friends," "Clients," etc.), a situational context (e.g., at work, with clients, etc.), and the like.

In one embodiment, the primary user may use the blacklist engine 128 to select users to be added to the blacklist 124 by tagging them during an encounter within the virtual world. The selection of a user for blacklisting may be accompanied by automatically capturing the current situational context. Accordingly, the selected user may be put on a situational blacklist, without requiring the primary user to manually define the situational context of the blacklist (e.g., location, time frame, user profile, etc.). Further, prior to adding the selected user to the blacklist 124, the primary user may be allowed to review and modify the blacklist specification, according to one embodiment. For example, the primary user may interact with an interface provided by the blacklist engine 128 in order to review and modify the characteristics to be stored in the blacklist 124.

In one embodiment, the blacklist engine 128 may be further configured to assist the primary user in avoiding encounters with blacklisted users. More specifically, the blacklist engine 128 may be configured to evaluate the blacklist 124 in order to determine situations (i.e., locations, times, activities, groups, etc.) in which the primary user will be likely to encounter a blacklisted user, and to alert the primary user so as to avoid those situations. In one embodiment, the blacklist engine 128 may be configured to determine the current locations of blacklisted users within the virtual world 130. Further, the blacklist engine 128 may use the movement history 125 to analyze previous movements of the blacklisted users in order to predict probabilities that they will be present at given locations at given times. That is, certain characteristics of a user's past movements (e.g., movement patterns, frequencies, times, etc.) may be analyzed using statistical and/or probabilistic analysis to generate predictions of future movements. In one embodiment, the predicted probabilities may be analyzed using the primary user's travel plans within the virtual world 130, in order to determine the likelihood of the primary user encountering blacklisted users. This analysis may include consideration of situational blacklists. That is, whether a potential encounter will take place under any situational characteristics (i.e., location, time, profile, group, etc.) that may be assigned to the blacklisted user in the blacklist 124.

In one embodiment, the blacklist engine 128 may interact with the visibility engine 127 in order to consider lines of sight in predicting a probability of encountering a blacklisted user. The visibility engine 127 may be a software application configured to determine lines of sight between two avatars in specific locations of the virtual world 130. The lines of sight may be determined for the present locations of two avatars, as well as predicted future locations of the avatars (i.e., locations based on predictions of future movements, as described above). In one embodiment, the lines of sight may be determined based on a specified maximum viewing distance between two avatars. If two avatars are further apart than the maximum viewing distance, the visibility engine 127 may determine that one avatar may not be visible to another avatar. Further, the lines of sight may also be determined based on any virtual objects 132 that may be located between two avatars. For example, the line of sight 282 may be affected by characteristics of an intervening virtual object 132, including the object's shape, material, openings, height, and the like. Thus, where two avatars are on opposite sides of an opaque wall having dimensions sufficient to preclude the avatars from seeing each other, then the avatars are considered as not being within a line of sight of each other. Conversely, if the same wall is transparent (and assuming no other objects) then the avatars will be considered to be within respective lines of sight.

In one embodiment, a line of sight may be determined based on a view perspective being displayed to a user (i.e., a first-person perspective or a third-person perspective). In the case of a first-person perspective, determining whether a first avatar is within a line of sight of a second avatar depends upon a field of vision of the second avatar (i.e., what is visible from the virtual eyes of the second avatar). The field of vision may vary from one virtual world to another according to well-known graphical considerations of depth perception, peripheral view, lighting, etc. Further, field of vision (and/or line of sight) may vary or depend upon characteristics of the avatar itself. For example, the second avatar may require corrective lenses. Therefore, the field of vision of the second avatar may depend upon whether the second avatar is wearing the appropriate corrective lenses. In the absence of appropriate corrective lenses, the rendering of the virtual world to a user of the second avatar may be made to appear fuzzy, thereby providing the user with a simulation of what the second avatar sees. In this case, the field of vision of the second avatar is substantially limited, relative to when the second avatar is wearing the appropriate corrective lenses.

After determining the probabilities of encountering blacklisted users, the blacklist engine 128 may also be configured to present the primary user with a display of likely encounters with blacklisted users. For example, the blacklist engine 128 may generate a text listing of likely encounters, or may generate a graphical representation of a map of the virtual world 130, with visual indicators (e.g., colors, symbols, labels, etc.) showing the likelihood of encounters within various areas of the map. Furthermore, the blacklist engine 128 may be configured to suggest alternative travel plans (e.g., alternative routes, destinations, times, etc.), so as to reduce the likelihood of encountering blacklisted users. Such alternative travel plans may reflect current and predicted lines of sight determined by the visibility engine 127.

In one embodiment, the blacklist engine 128 may also be configured to consider the avoidance level of each blacklisted user in suggesting alternative travel plans. For example, assuming that the primary user must travel through one of two areas to reach his destination, and that each area includes equal numbers of blacklisted users, the blacklist engine 128 may recommend that the primary user travel through the area that has a lower cumulative avoidance level (i.e., the cumulative avoidance levels of all blacklisted users in the area). That is, the blacklist engine 128 may recommend that the primary user avoid the area that includes blacklisted users which are to be avoided more strongly.

In another embodiment, the blacklist engine 128 may be configured to consider a negative avoidance level assigned to other users, meaning that the primary user may wish to maximize the probability of encountering those users. For example, in the situation that the primary user has assigned a negative avoidance score to another user, the blacklist engine 128 may suggest travel plans or locations such that the primary user will have a higher likelihood of being within a line of sight of the other user.

Of course, the embodiments described above are intended to be illustrative, and are not limiting of the invention. Other embodiments are broadly contemplated. For example, the blacklist 124 and the blacklist engine 128 may be included in the client computer 110. In another example, the functionality of the blacklist engine 128 may be incorporated into the client application 109, or in the virtual world 130.

Figure 3:
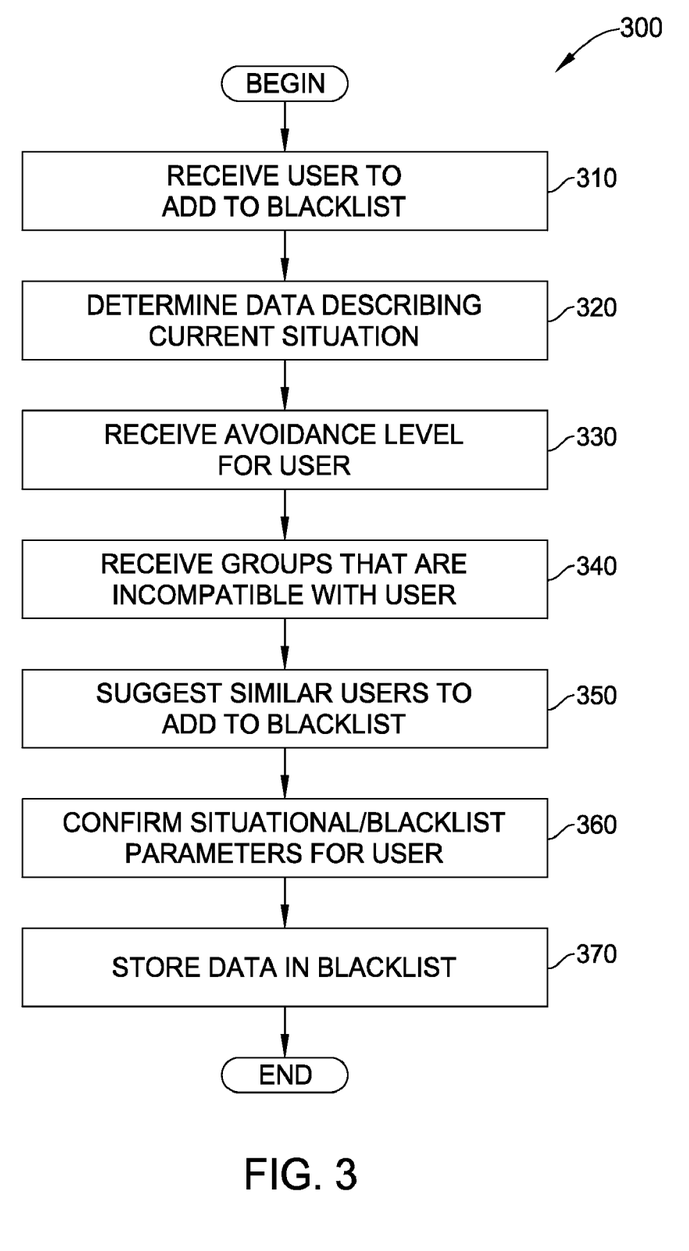
FIG. 3 is a flow diagram illustrating a method for generating a blacklist for use in avoiding specific users of an immersive virtual environment, according to one embodiment of the invention.

FIG. 3 is a flow diagram illustrating a method 300 for defining a blacklist for a user of a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, by receiving a command to add a user to a blacklist. For example, a primary user may enter a command in the client application 109 for manually adding a given user to the primary user's blacklist 124. In one embodiment, the primary user may specify that the blacklisted user is to have an absolute blacklist or a situational blacklist. At step 320, data describing the current situation may be determined. For example, the blacklist engine 128 may be configured to determine characteristics of the primary user's current situation (e.g., location, profile, activity, companions, etc.), and to store the situational data in the blacklist 124. Thereafter, as described below with reference to FIG. 4, such situational data may be used in performing a method for avoiding specific users.

At step 330, an avoidance level for the blacklisted user may be received. That is, the primary user may specify a degree of preference for avoiding the blacklisted user. For example, the user may provide an avoidance level by specifying a quantitative score in the blacklist engine 128. In some situations, the primary user may wish to encounter a particular user in the virtual world. Accordingly, the primary user may specify the avoidance level as a negative number, meaning a degree of preference for encountering the user. At step 340, groups that are not compatible with the blacklisted user may be received. That is, the primary user may specify a preference for avoiding the blacklisted user while in the company of certain groups of users. For example, the primary user may interact with the blacklist engine 128 to specify that the blacklisted user is to be avoided in the situation that the primary user is in the company of a "Business Clients" group of users. At step 350, similar users may be suggested to the primary user be added to the current blacklist. That is, the primary user may be presented with additional users that have similar characteristics to the blacklisted user. The primary user may then decide whether to add any of the additional users to the current blacklist.

At step 360, the current blacklist data (i.e., the user name, avoidance level, blacklist type, situational data, etc.) may be presented to the primary user for review and approval prior to finalizing the blacklist. For example, the blacklist engine 128 may present the primary user with a summary of a situational blacklist, including the blacklisted user's name, a location, a profile, and an incompatible group. The primary user may then modify and/or approve the situational blacklist. At step 370, the current blacklist data may be stored in a blacklist data structure. For example, the blacklist engine 128 may store the blacklist data in the blacklist 124. After step 370, the method 300 terminates.

Figure 4:
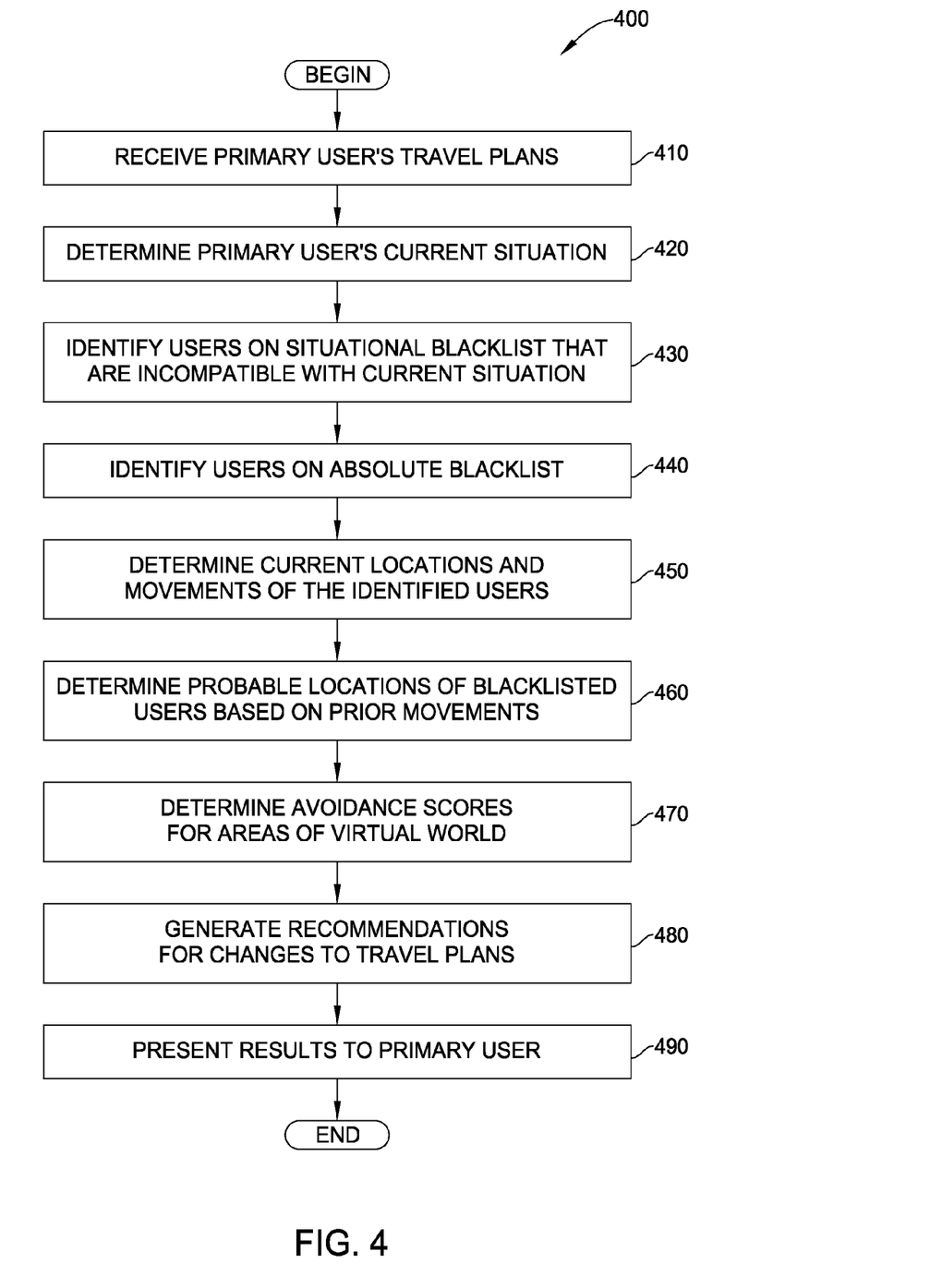
FIG. 4 is a flow diagram illustrating a method for avoiding specific users of an immersive virtual environment by using blacklists, according to one embodiment of the invention.

FIG. 4 is a flow diagram illustrating a method 400 for avoiding specific users of an immersive virtual environment by using blacklists, according to one embodiment of the invention. For the sake of illustration, method 400 is described in conjunction with the system of FIG. 1. However, persons skilled in the art will understand that any system configured to perform the steps of method 400, in any order, is within the scope of the present invention.

The method 400 begins at step 410, by receiving the primary user's travel plans within the virtual world. The primary user may provide this information, for example, by entering a list of intended destinations into a user interface provided by the client application 109, or by uploading an itinerary to the blacklist engine 128. Optionally, the blacklist engine 128 may be configured to anticipate the primary user's likely destinations based on stored records of previous travels within the virtual world.

At step 420, the primary user's current situation within the virtual world may be determined. For example, the blacklist engine 128 may be configured to determine the primary user's current profile in the virtual world (e.g., a "Work" profile, a "Gaming" profile, etc.), the primary user's current companions, and the like. At step 430, blacklisted users that are incompatible with the primary user's current situation may be identified. For example, the blacklist engine 128 may be configured to identify users that are specified in the blacklist 124 as having a situational blacklist that matches the primary user's current situation. That is, if the primary user is currently using a "Work" profile, then the blacklist engine 128 may identify any users that have a situational blacklist that specifies they are to be avoided while using the "Work" profile. At step 440, users that have an absolute blacklist (i.e., users to avoid in all situations) may be identified. For example, the blacklist engine 128 may be configured to identify users that are specified in the blacklist 124 as having an absolute blacklist.

At step 450, the current locations and movements of the identified users may be determined. For example, the blacklist engine 128 may be configured to determine the locations and movements of the blacklisted users identified at steps 430 and 440. Such location and movement information may be provided, e.g., by the virtual world 130. At step 460, the probable locations of the identified users may be determined, based on the current user locations and movements determined at step 450, as well as stored data describing any past movements of the identified users. For example, the blacklist engine 128 may be configured to determine the probable locations of the identified users based on statistical and/or probabilistic analysis of the movement history 125, which may store characteristics of the identified users' past movements (e.g., movement patterns, frequencies, times, etc.).

At step 470, avoidance scores for different areas of the virtual world may be determined. For example, the blacklist engine 128 may be configured to determine avoidance scores for areas of the virtual world 130. In one embodiment, avoidance scores are values representing the likelihood of encountering one or more blacklisted users within a given area of a virtual world. The avoidance score for a given area may be based on the number of identified users that are present in (or projected to be in) the area. The avoidance score may also be based on the avoidance level assigned to the blacklisted user, meaning the degree to which the primary user wishes to avoid the blacklisted user. Note that, in one embodiment, an avoidance level may be negative, meaning a user that the primary user wishes to encounter. The avoidance score may also be based on the likelihood that the primary user will be in a line of sight of the blacklisted user. For example, the visibility engine 127 may be used to determine the likelihood that the primary user may pass through a particular area without being in the line of sight of the blacklisted user. The blacklisted user's line of sight may be determined based on distances between avatars, and on characteristics of any intervening objects between the avatars. For example, determining the line of sight 282 may be based on virtual objects 132, as shown in FIG. 2. The avoidance score may also be based on the primary user's travel plans, as well as any planned changes in the primary user's situation (e.g., switching to a "Casual" profile, planning to meet with a family group at a given time, etc.).

At step 480, recommendations for changes to the primary user's travel plans may be generated. For example, the blacklist engine 128 may be configured to compare the primary user's travel plans (received at step 410) to the avoidance scores for areas of the virtual world (determined at step 470). On the basis of this comparison, the blacklist engine 128 may generate recommendations for alternative travel plans (e.g., alternate routes, destinations, times, etc.).

While the foregoing is directed to embodiments of the present invention, other and further embodiments of the invention may be devised without departing from the basic scope thereof, and the scope thereof is determined by the claims that follow.

What is claimed is:

1. A computer implemented method, comprising:
   receiving navigational input for moving an avatar of a user through a virtual world;
   responsive to the navigational input, moving the avatar through the virtual world;
   during movement of the avatar through the virtual world, determining information relating to possible encounters with one or more other avatars the user desires to avoid encountering;
   the information being determined according to predefined user-avoidance criteria specific to the user;
   determining, for each of one or more locations in the virtual world, a probability that at least one of the one or more other avatars that the user desires to avoid will be in the one or more locations at a future time, wherein the probability is included in the information; and
   providing the information to the user using visual indicators that represent the probability of each of the one or more locations.

2. The computer-implemented method of claim 1, wherein determining the information comprises:
   determining one or more characteristics of the situation context of the user within the virtual world; and
   identifying, from a predefined blacklist, one or more other avatars which the user desires to avoid encountering in situations matching the determined one or more characteristics.

3. The computer-implemented method of claim 1, wherein determining the information comprises determining a one or more sight lines for the avatar of the user within the virtual world, wherein each sight line is based on at least one of: (i) one or more intervening object, (ii) a distance, (iii) a user perspective, (iv) a vision range of each of the one or more other avatars, and (v) a predefined maximum viewing distance within the virtual world.

4. The computer-implemented method of claim 1, wherein determining probability is based on at least one of: (i) a current location of the at least one of the one or more other avatars, (ii) a current movement of the at least one of the one or more other avatars, and (iii) a record of past locations and movements of at least one of the one or more other avatars.

5. The computer-implemented method of claim 1, wherein the predefined user-avoidance criteria includes a degree of preference of the user for avoiding each of the one or more other avatars, and further comprising:
   determining, for each of the one or more locations of the virtual world, an avoidance score based on: (i) the probability of the user encountering the at least one of the one or more other avatars within the location, and (ii) the degree of preference for avoiding each of the one or more other avatars; and
   providing the determined avoidance score for each of the one or more locations to the user.

6. The computer-implemented method of claim 5, wherein providing the determined avoidance score for each of the one or more locations comprises presenting a map illustration of the one or more locations, wherein the map illustration includes an indication of the determined avoidance score for each of the one or more locations.

7. The computer-implemented method of claim 6, wherein the indication of the determined avoidance score comprises at least one of: (i) a text label, (ii) a color, (iii) a shade, (iv) a graphic pattern, (v) a symbol, (vi) a number label, (vii) a border, and (viii) a highlight.

8. The computer-implemented method of claim 1, wherein the received navigational input comprises a travel plan to one or more destinations within the virtual world, and further comprising:
   determining, based on the determined information relating to possible encounters with one or more other avatars, one or more recommendations of alternative travel plans to the one or more destinations; and
   providing the determined one or more recommendations of alternative travel plans to the user.

9. A computer-readable storage medium including a program, which when executed on a processor performs an operation, comprising:
   receiving navigational input for moving an avatar of a user through a virtual world;
   responsive to the navigational input, moving the avatar through the virtual world;
   during movement of the avatar through the virtual world, determining information relating to possible encounters with one or more other avatars the user desires to avoid encountering;
   the information being determined according to predefined user-avoidance criteria specific to the user;
   determining, for each of one or more locations in the virtual world, a probability that at least one of the one or more other avatars that the user desires to avoid will be in the one or more locations at a future time, wherein the probability is included in the information; and
   providing the information to the user using visual indicators that represent the probability of each of the one or more locations.

10. The computer-readable storage medium of claim 9, wherein determining the information comprises:
    determining one or more characteristics of the situation context of the user within the virtual world; and identifying, from a predefined blacklist, one or more other avatars which the user desires to avoid encountering in situations matching the determined one or more characteristics.

11. The computer-readable storage medium of claim 10, wherein one or more characteristics of the situation context of the user within the virtual world are selected from: (i) a location, (ii) a time frame, (iii) a companion user, (iv) a current activity, (v) a user profile, and (vi) a membership in a user group.

12. The computer-readable storage medium of claim 9, wherein determining the probability is based on at least one of: (i) a current location of the at least one of the one or more other avatars, (ii) a current movement of the at least one of the one or more other avatars, and (iii) a record of past locations and movements of at least one of the the one or more other avatars.

13. The computer-readable storage medium of claim 9, wherein the predefined user-avoidance criteria includes a degree of preference of the user for avoiding each of the one or more other avatars, and further comprising:
   determining, for each of the one or more locations of the virtual world, an avoidance score based on: (i) the probability of the user encountering the at least one of the one or more other avatars within the location, and (ii) the degree of preference for avoiding each of the one or more other avatars; and
   providing the determined avoidance score for each of the one or more locations to the user.

14. The computer-readable storage medium of claim 13, wherein providing the determined avoidance score for each of the one or more locations comprises presenting a map illustration of the one or more locations, wherein the map illustration includes an indication of the determined avoidance score for each of the one or more locations.

15. The computer-readable storage medium of claim 14, wherein the indication of the determined avoidance score comprises at least one of: (i) a text label, (ii) a color, (iii) a shade, (iv) a graphic pattern, (v) a symbol, (vi) a number label, (vii) a border, and (viii) a highlight.

16. The computer-readable storage medium of claim 9, wherein the received navigational input comprises a travel plan to one or more destinations within the virtual world, and further comprising:
   determining, based on the determined information relating to possible encounters with one or more other avatars, one or more recommendations of alternative travel plans to the one or more destinations; and
   providing the determined one or more recommendations of alternative travel plans to the user.

17. A system, comprising:
a processor; and
a memory containing a program, which when executed by the processor is configured to perform the steps of:
   receiving navigational input for moving an avatar of a user through a virtual world;
   responsive to the navigational input, moving the avatar through the virtual world;
   during movement of the avatar through the virtual world, determining information relating to possible encounters with one or more other avatars the user desires to avoid encountering;
   the information being determined according to predefined user-avoidance criteria specific to the user;
   determining, for each of one or more locations in the virtual world, a probability that at least one of the one or more other avatars that the user desires to avoid will be in the one or more locations at a future time, wherein the probability is included in the information; and
   providing the information to the user using visual indicators that represent the probability of each of the one or more locations.

18. The system of claim 17, wherein determining the information comprises:
   determining one or more characteristics of the situation context of the user within the virtual world; and
   identifying, from a predefined blacklist, one or more other avatars which the user desires to avoid encountering in situations matching the determined one or more characteristics.

19. The system of claim 18, wherein one or more characteristics of the situation context of the user within the virtual world are selected from: (i) a location, (ii) a time frame, (iii) a companion user, (iv) a current activity, (v) a user profile, and (vi) a membership in a user group.

20. The system of claim 17, wherein determining the probability is based on at least one of: (i) a current location of the at least one of the one or more other avatars, (ii) a current movement of the at least one of the one or more other avatars, and (iii) a record of past locations and movements of at least one of the the one or more other avatars.

21. The system of claim 17, wherein the predefined user-avoidance criteria includes a degree of preference of the user for avoiding each of the one or more other avatars, and wherein the program further comprises the steps of:
   determining, for each of the one or more locations of the virtual world, an avoidance score based on: (i) the probability of the user encountering the at least one of the one or more other avatars within the location, and (ii) the degree of preference for avoiding each of the one or more other avatars; and
   providing the determined avoidance score for each of the one or more locations to the user.

22. The system of claim 21, wherein providing the determined avoidance score for each of the one or more locations comprises presenting a map illustration of the one or more locations, wherein the map illustration includes an indication of the determined avoidance score for each of the one or more locations.

23. The system of claim 22, wherein the indication of the determined avoidance score comprises at least one of: (i) a text label, (ii) a color, (iii) a shade, (iv) a graphic pattern, (v) a symbol, (vi) a number label, (vii) a border, and (viii) a highlight.

24. The system of claim 17, wherein the received navigational input comprises a travel plan to one or more destinations within the virtual world, and wherein the program further comprises the steps of:
   determining, based on the determined information relating to possible encounters with one or more other avatars, one or more recommendations of alternative travel plans to the one or more destinations; and
   providing the determined one or more recommendations of alternative travel plans to the user.

* * * * *